US010368122B2

(12) United States Patent
Taylor

(10) Patent No.: US 10,368,122 B2
(45) Date of Patent: *Jul. 30, 2019

(54) MEDIA SHARING AND COMMUNICATION SYSTEM

(71) Applicant: David A. Taylor, Sterling Heights, MI (US)

(72) Inventor: David A. Taylor, Sterling Heights, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/937,001

(22) Filed: Jul. 8, 2013

(65) Prior Publication Data

US 2014/0259062 A1 Sep. 11, 2014

Related U.S. Application Data

(60) Provisional application No. 61/773,518, filed on Mar. 6, 2013.

(51) Int. Cl.
*H04N 21/63* (2011.01)
*H04N 21/433* (2011.01)
*H04N 21/4788* (2011.01)

(52) U.S. Cl.
CPC ..... *H04N 21/4334* (2013.01); *H04N 21/4788* (2013.01); *H04N 21/632* (2013.01)

(58) Field of Classification Search
CPC .......................... H04N 21/4788; H04N 21/632
See application file for complete search history.

(56) References Cited

U.S. PATENT DOCUMENTS

| 7,643,564 | B2 | 1/2010 | Sheynman et al. |
| 2003/0088872 | A1* | 5/2003 | Maissel et al. ................. 725/46 |
| 2005/0015809 | A1* | 1/2005 | Boys ..................... H04H 60/80 |
| | | | 725/105 |
| 2005/0028199 | A1* | 2/2005 | Borden, IV ..................... 725/40 |
| 2005/0094031 | A1* | 5/2005 | Tecot et al. .................. 348/473 |
| 2007/0217436 | A1 | 9/2007 | Markley et al. |
| 2007/0220575 | A1* | 9/2007 | Cooper et al. ................ 725/118 |
| 2007/0283380 | A1 | 12/2007 | Aoki et al. |
| 2007/0288970 | A1* | 12/2007 | Tedenvall ........................ 725/86 |
| 2008/0120325 | A1* | 5/2008 | Davis ............................ 707/102 |
| 2008/0228733 | A1 | 9/2008 | Davis et al. |

(Continued)

*Primary Examiner* — Junior O Mendoza
(74) *Attorney, Agent, or Firm* — Kohn and Associates, PLLC

(57) ABSTRACT

The present invention relates generally to media sharing and communication systems and methods of providing the same. In one exemplary embodiment, the system includes a media content provider configured to disseminate media to a plurality of media receivers. The system further includes a first media receiver in communication with the media content provider, the first media receiver including a first digital recording device configured to record media transmitted by the media content provider. The system further includes a second media receiver in communication with the media content provider, the second media receiver including a second digital recording device configured to record media transmitted by the media content provider. The system further includes a first user interface capable of initiating recording of media through the first digital recording device and transmitting the recorded media to the second media receiver through a communication link.

11 Claims, 5 Drawing Sheets

(56) References Cited

U.S. PATENT DOCUMENTS

| | | |
|---|---|---|
| 2009/0070845 A1 | 3/2009 | White et al. |
| 2009/0132717 A1 | 5/2009 | Maes |
| 2009/0158325 A1 | 6/2009 | Johnson |
| 2009/0217332 A1 | 8/2009 | Hindle et al. |
| 2009/0228938 A1* | 9/2009 | White et al. .................. 725/87 |
| 2010/0011390 A1 | 1/2010 | Coles et al. |
| 2010/0071014 A1 | 3/2010 | Brown et al. |
| 2010/0095337 A1 | 4/2010 | Dua |
| 2010/0100729 A1* | 4/2010 | Read et al. .................. 713/156 |
| 2010/0146567 A1 | 6/2010 | Mehta et al. |
| 2010/0242074 A1* | 9/2010 | Rouse .................. H04L 12/588 |
| | | 725/100 |
| 2010/0306815 A1 | 12/2010 | Emerson et al. |
| 2011/0075841 A1* | 3/2011 | Chen .................. H04N 21/2347 |
| | | 380/200 |
| 2011/0126258 A1* | 5/2011 | Emerson et al. ............ 725/133 |
| 2011/0131604 A1 | 6/2011 | Van Hoff et al. |
| 2011/0179439 A1* | 7/2011 | Elbarky ............ H04N 7/17318 |
| | | 725/25 |
| 2011/0296466 A1* | 12/2011 | Nguyen et al. .................. 725/55 |
| 2012/0092444 A1 | 4/2012 | Mackie et al. |
| 2012/0311633 A1* | 12/2012 | Mandrekar ............ H04N 5/445 |
| | | 725/40 |
| 2014/0068692 A1* | 3/2014 | Archibong et al. .......... 725/116 |
| 2016/0165265 A1* | 6/2016 | Archibong ............ G06Q 50/01 |
| | | 725/54 |
| 2018/0324496 A1* | 11/2018 | Taylor .................. H04N 21/632 |

\* cited by examiner

MEDIA SHARING AND COMMUNICATION SYSTEM

CROSS-REFERENCE TO RELATED APPLICATION

The present application claims benefit of U.S. Provisional Patent Application No. 61/773,518, filed Mar. 6, 2013, the contents of which are hereby incorporated by reference in its entirety for all purposes.

FIELD OF THE INVENTION

The present invention relates generally to media sharing and communication systems and methods of providing the same.

BACKGROUND

Individuals having common bonds, both men and women, congregate together to watch events such as sports, theater, or otherwise. In one particular aspect, it is common for individuals to watch television programming including movies, sports, politics, or otherwise. This may occur in a public setting, such as bars, or in a private setting, such as one's home. During these programming events, individuals engage in discussions, exchange of ideas or beliefs, cheering or even badgering one another.

With the expansion in relationships between individuals, it is not always possible for individuals to participate in viewing events or programming together. This is particularly the case after individuals separate over time, such as after military service, college, or otherwise. However, recently it has become more common for individuals to maintain long distance relationships with one another. To this extent, various internet service providers have offered networking and communication systems between individuals. They provide the ability to send public and private messages to others in their networking group. They also provide the ability to share profiles and preferences with one another so as to exchange information. Examples of such networking systems include Facebook®, LinkedIn®, Twitter®, or otherwise.

However, while these and other networking means have provided some means for individuals to maintain contact, they do not effectively replace the ability for individuals to interact with one another, particularly when it comes to events and more particularly with television programming.

In view of the foregoing, there is a need for systems and methods to allow individuals to continue to enjoy events and programming together, without having to be at the same location. This allows for expanded networking in different aspects than before.

SUMMARY OF THE INVENTION

The present invention provides systems and methods for sharing and exchanging media between individuals. In one particular exemplary embodiment, the exchange of media is based upon known interests of others. The features of the present invention provide the ability for individuals that are remotely located to exchange communications, ideas or otherwise, particularly as it relates to media and more particularly television programming. Through the features of the present invention, it is possible to select and optionally record media streaming from a media content provider and transmit the media and/or information pertaining to the location of the media for downloading to another through a network established therebetween, which may also comprise a network being used to disseminate the media from the media content provider. The features of the present invention further provide the ability to include communication with the media and/or information pertaining to the location of the media. Further, the features of the present invention provide the ability to selectively distribute the media and/or information pertaining to the location of the media based upon user preference including an indication of desired media content.

Advancements through the features of the present invention provide a 'TubeMail'™, 'TubeShare'™, 'YouShare'™, communication system that allows individuals, who share the same cable or satellite provider, the ability to record and share portions or full episodes of sporting events, movies, shows or otherwise. The system further allows a user to establish a profile and attract other users or followers from social networks, such as Facebook, twitter or otherwise, based upon the type of programming the user views. Once a profile is established, an individual can enter in favorite shows, sports, commercials, celebrities or otherwise.

The communication system further includes a digital recording device, such as a DVR, that allows for media to be manually or automatically recorded based upon the user profile. The recorded media can be shared with other users having common elements within their user profile. The system further provides the ability to generate marketing and advertising based upon what the user is watching, user profile including age, gender, location or otherwise, interests such as favorite television shows, actresses or actors, sport teams, soap operas, musician, band, celebrity commercials or otherwise.

The communication system further provides socialization between users. The system request a user to send and receive a friend request, which must be approved by the recipient, in order to be added to the friend list and receive media. The system is further configured to suggest friends or other users that have similar interest so that media can be sent to individuals, of a user profile friend list, that has similar interests. The system further provides the ability to set up notification that will notify a user when other users are online or offline. Still further, the system includes an instant messaging exchange that is located across the bottom of a user interface.

In view of the forgoing, in one exemplary embodiment, the present invention provides a media sharing and communication system. The system includes a media content provider configured to disseminate media to a plurality of media receivers. The system further includes a first media receiver in communication with the media content provider, the first media receiver including a first digital recording device configured to record media transmitted by the media content provider. The system further includes a second media receiver in communication with the media content provider, the second media receiver including a second digital recording device configured to record media transmitted by the media content provider. The system further includes a first user interface capable of initiating recording of media through the first digital recording device and transmitting the recorded media to the second media receiver through a communication link.

The above-described and other features and advantages of the present invention will be appreciated and understood by those skilled in the art from the following detailed description, drawings, and appended claims.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

Figure 1:
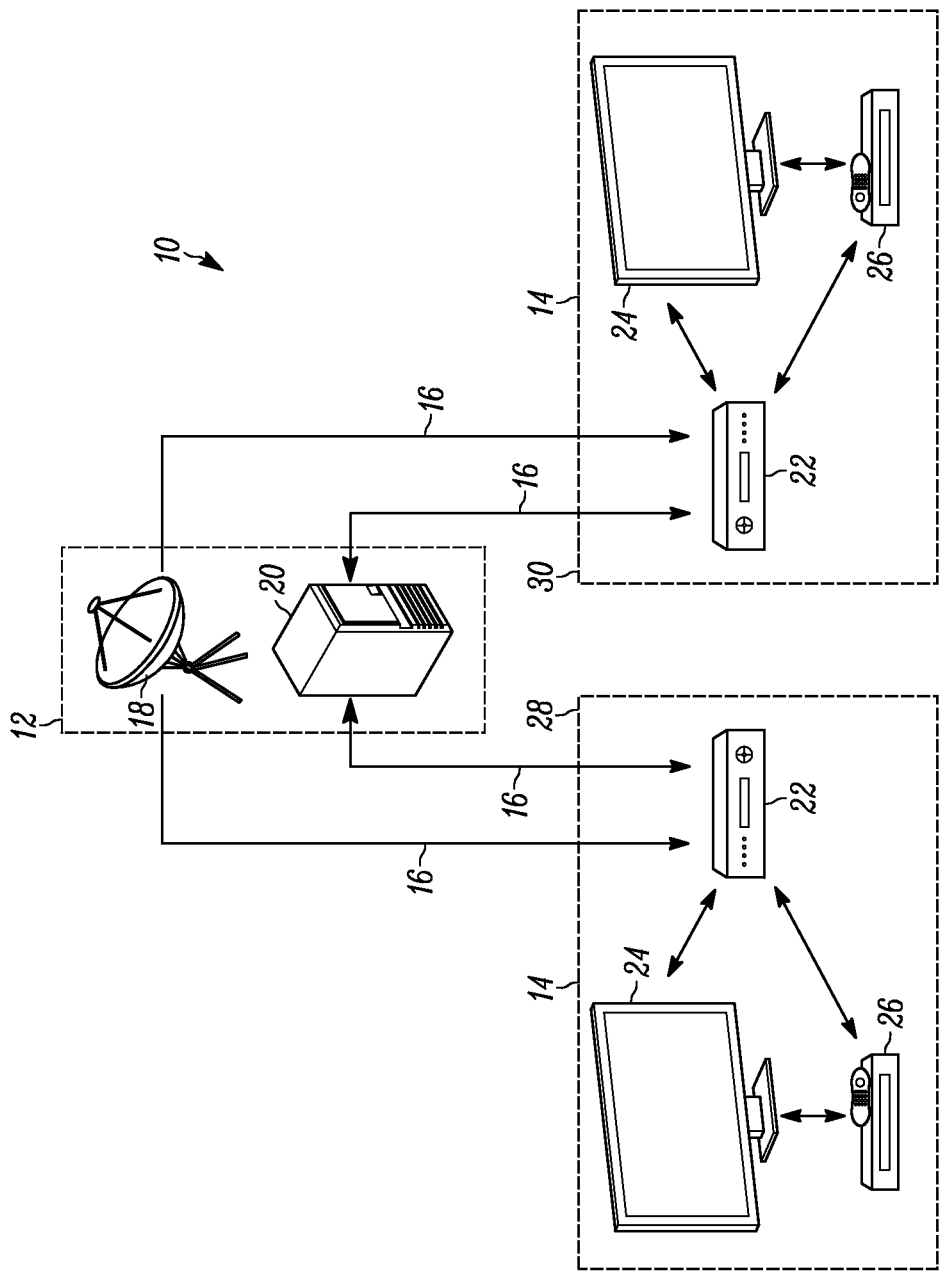
FIG. 1 illustrate a schematic view of a media sharing and communication system according to the teachings of the present invention.

Referring to FIG. 1, an exemplary embodiment of a media sharing and communication system 10 is shown. The system 10 includes a media content provider 12 configured to provide media content to a plurality of user systems 14 over one or more networks 16. The system 10 includes a transmitter 18 configured to transmit media, particularly media programming, to the user systems 14 over the one or more networks 16. The system 10 further includes a receiver 20 configured to receive media, or media information including identification information, from the user systems 14, over the one or more networks 16. The plurality of user systems 14 are configured to receive media, such as television programming, from the media content provider 12. In one exemplary embodiment, the user systems 14 include a user transmitter/receiver 22, in communication with the media content provider, a display screen 24 for viewing media content received by the user transmitter/receiver, and in one particular exemplary embodiment a digital recording device 26 for recording digital information received by the transmitter/receiver 18. In one particular configuration, the user transmitter/receiver 22 is further configured for transmitting data stored by the digital recording device 26.

In one exemplary mode of operation, digital media is transmitted by the media content provider 12 to the plurality of user systems 14. The media transmitted by the media content provider 12 may comprise any media transmitted by a network including programming shows, movies, sporting events, or otherwise. The transmitted media is received by the user systems 14 through the one or more networks 16. The media received by the user transmitter/receiver 22 is further transmitted to the display screen 24 for viewing. During viewing, once the user of the user system 14 determines they wish to share media content, the digital recording device 26 is activated to record the desired media or record information pertaining to the desired media. The user of the user system 14 generates a message and the recorded media or record information pertaining to the desired media along with the message is then transmitted to another user system 14, via the network 16, through the user transmitter/receiver 22. Dissemination of media from one user system 14 to another user system 14 may be based upon selection by a user of the first user system 14, based upon user profile set up by a user of the first or second user system 14, or otherwise. Once the recorded media or media information is received by the second user system 14, the second user selectively reviews the message and views the media.

In greater detail, with reference to FIGS. 1-4, the media content provider 12 is configured for disseminating media to a plurality of user systems 14. In one exemplary embodiment, the media content provider 12 comprises a cable television provider, satellite television provider, online movie or other media provider, or otherwise. The media content provider 12 provides assortment of media including audio/visual media, identification information or otherwise. The media provides one or more, or plurality of programming for the user systems 14. Examples of programming available through the media, without limitation, includes movies, network programming, sporting events, concerts, or otherwise. The media disseminated to the user systems 14 may be streamed through or stored on local hard drive of the media content provider 12.

The transmitter 18 of the media content provider 12 is configured to disseminate media to a plurality of user systems 14 over one or more networks 16. In one configuration, the network comprises a hardwired network, such as a cable network extending from the media content provider 12 to the user systems 14. In another configuration, the network comprises or includes a wireless network configured for broadcasting signals through radio waves or otherwise. In the latter configuration the media content provider 12 includes a satellite dish or other means for broadcasting media. It is contemplated that the media disseminated from the media content provider 12 may be streamed through the media content provider or stored on one or more digital recording device.

The receiver 20 of the media content provider is configured to receive information from the user systems 14. In one configuration, the receiver 20 records data transmitted by the user systems including media, program information, both or otherwise. Accordingly, in view of the many potential user systems 14, it is contemplated that the receiver 20 includes many data storage devices. In another configuration, the receiver 20 is further configured for transmitting the received or recorded media to another user system 14, according to a request by the originating user system 14.

Figure 2:
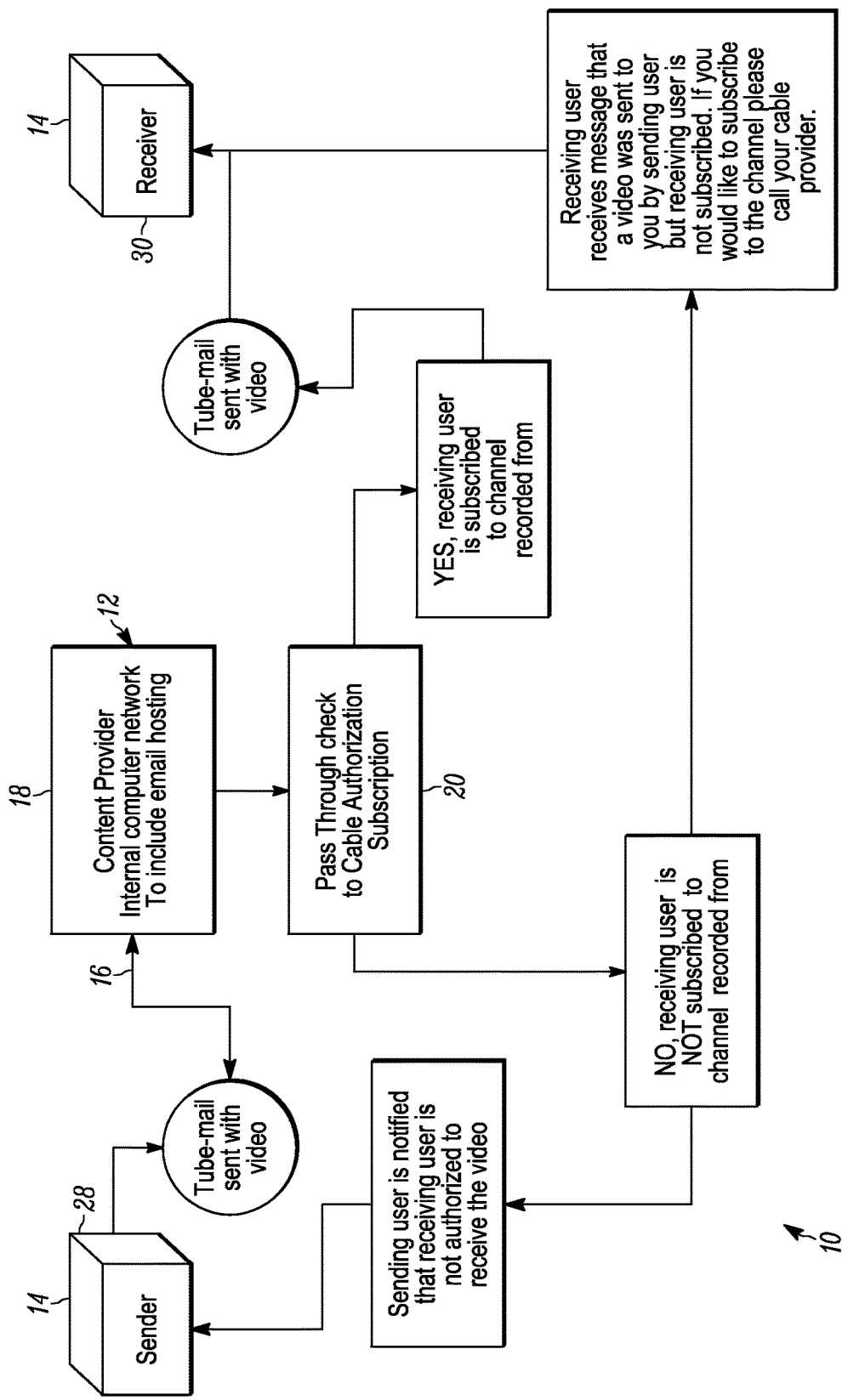
FIG. 2 illustrates a schematic view of another media sharing and communication system according to the teachings of the present invention.
Figure 3:
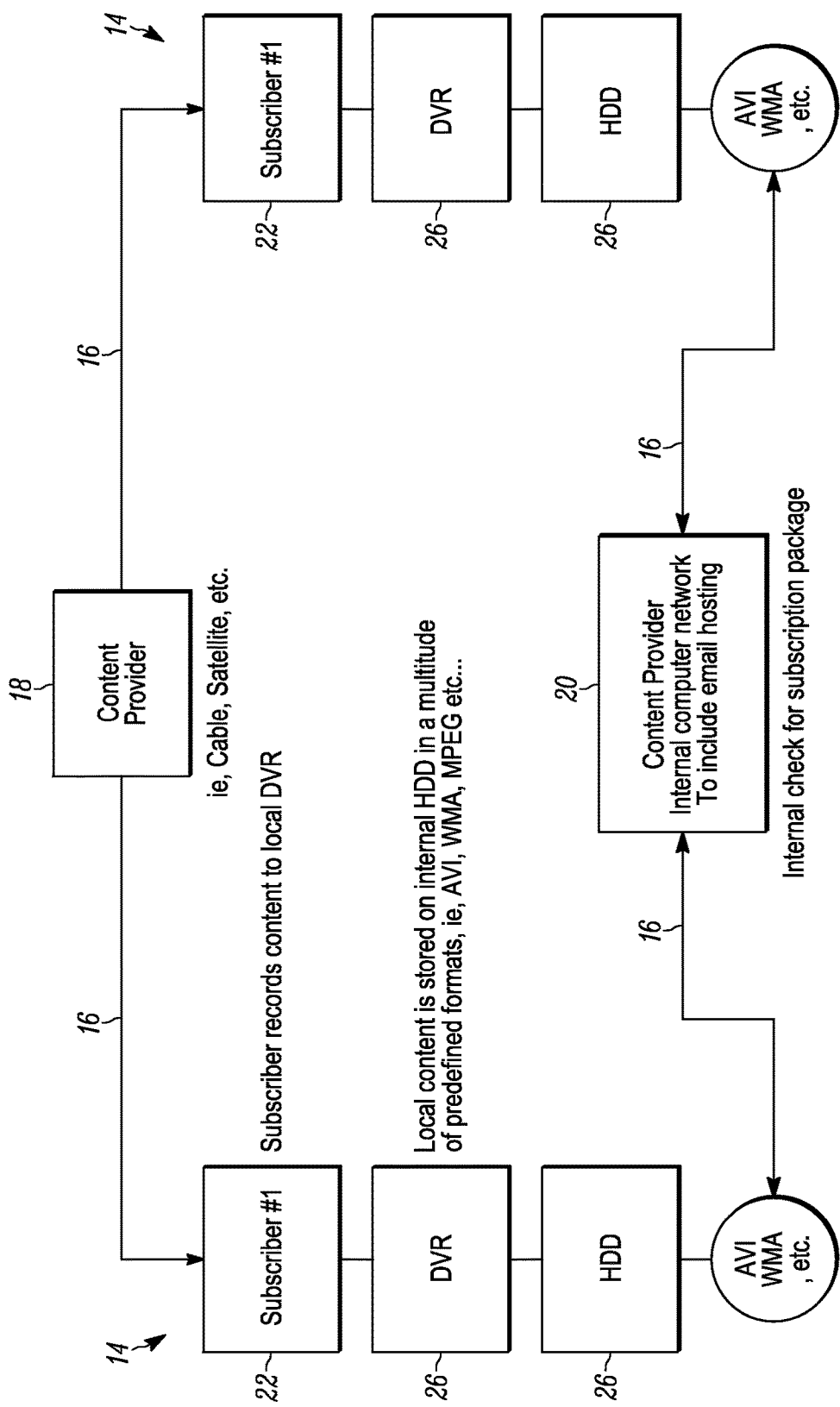
FIG. 3 illustrates a schematic view of another media sharing and communication system according to the teachings of the present invention.
Figure 4:
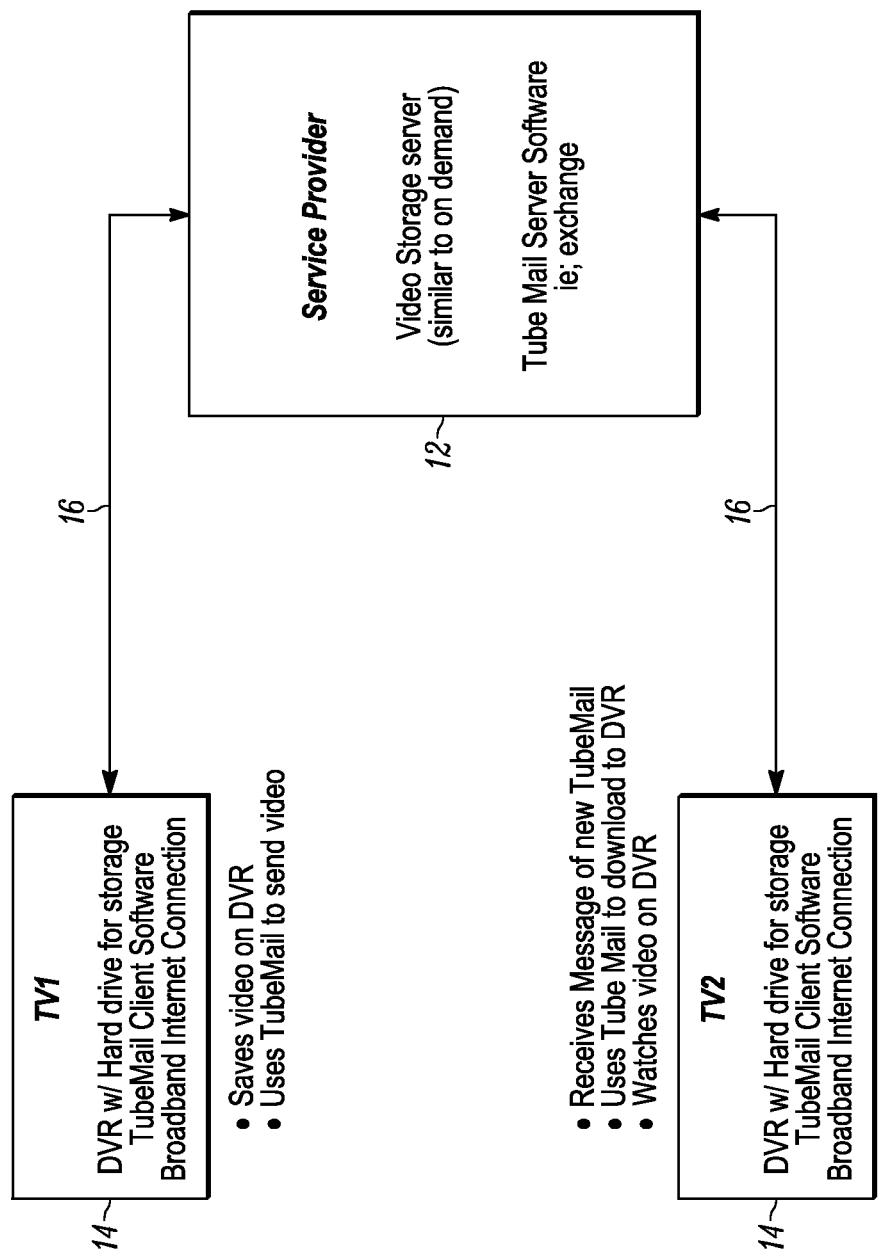
FIG. 4 illustrates a schematic view of another media sharing and communication system according to the teachings of the present invention.

In one particular exemplary embodiment, referring to FIG. 2, the receiver 20 is configured with suitable software for reviewing media transmitted by a user system. In this configuration, it is possible for the receiver 20 to review the identification information of the media transmitted by a first user system 28 and confirm that a designated second user system 30 is authorized to receive the media. In this configuration, the receiver 20 confirms that the media transmitted by the first user system 28 is viewable by the second user system 30 through the viewing package held by the second user system. For example, should the first user system 28 transmit media from a first channel the receiver 20 confirms that the second user system 30 is authorized to view media on the first channel. Should the programming subscribed by the second user system 30 include the first channel then the second user system is authorized to receive and view the media along with any communication attached therewith. Should the programming purchased by the second user system 30 not include the first channel then the second user system is notified that media could not be received due to programming configuration subscribed by the second user.

Also, the first user system 28 is notified that the second user system 30 is not authorized to receive the media due to programming subscription of the second user system.

Referring again to FIG. 1, the user system 14, e.g. first user system 28, second user system 30 or otherwise, include the user transmitter/receiver 22, which is configured to receive media from the media content provider 12 and in one particular exemplary embodiment transmit media and/or communication to the media content provider 12 and another user system 14. In one exemplary embodiment, the user transmitter/receiver 22 is similar or includes a cable box, satellite receiver or similar devise commonly used to receive broadcasted digital programming. It should be appreciated that the transmitter/receiver 22 may comprise a single unit or several units.

The user system 14 further include display screen 24 configured to display media received by the user transmitter/receiver 22. The display screen comprises any suitable display screen including standard definition televisions, high definition televisions, monitors or otherwise. The display screen 24 is in communication with the transmitter/receiver 22 through suitable connecting cables or otherwise. The user systems 14 further includes digital recording device 26 configured to record media received by the user transmitter/receiver 22. Examples of suitable digital recording devices 26 includes DVRs or otherwise. The digital recording device 26 is in communication with the transmitter/receiver 22 through suitable connecting cables or otherwise.

Figure 5:
FIG. 5 illustrates a screen-shot of an exemplary user interface according to the teachings of the present invention.

Referring to FIGS. 1 and 5, the user systems 14 further include suitable software for generation of a user interface 32 that is useable with a remote keypad, mouse and/or other user interface devices. In one exemplary embodiment, the suitable software for generating the user interface 32 is stored on a memory device of the user transmitter/receiver 22. In the configuration shown in FIG. 5, the user interface provides means for composing messages and attaching media segments, e.g. audio, video and/or identification information, to the composed message. The completed communication is then sendable to other user systems 14. In the configuration shown, the user interface 32 includes a 'FRIENDS' section indicating users of other user systems 14. The user interface 32 further includes 'NEW', 'REPLY' and 'FORWARD' icons for creating, responding and forwarding communications, which may include media. The user interface 32 further includes 'INBOX' section listing communication received from other user systems 14 including 'FROM', communication or media 'SUBJECT', date 'RECIEVED', and file 'SIZE' In one exemplary embodiment, the user interface 32 includes 'Banner Add Space' for displaying relevant marketing to the user of the user system, which may be based upon a user profile, transmitted or received media and/or communication, or otherwise.

As mentioned, in one exemplary embodiment the user system 14 includes suitable software and user interface 32 for generating a user profile. The user profile includes information of a user of the user system 14 to provide an indication of personal preference. For example, information that can be inputted into the user interface includes types of media, e.g. audio, video or identification information, a user enjoys. Other user preferences includes programming likes and dislikes including sports, movies, programming or otherwise. Other user preferences are possible.

In greater detail, in one exemplary embodiment, the user profile provides the ability to indicate special interests. In one particular configuration, the user profile is used to generate suggested viewing. The user profile provides the ability of a user to indicate particular interests which may include a particular actor, athlete, programming type or otherwise. Based upon the user profile, the media sharing and communication system 10 generates a listing of program based upon the user programming, which may include similar interest such as indicated actors, athletes, programming type or otherwise.

For example, should the user profile indicates a favorite baseball player and the particular baseball player is participating in an interview on one programming channel, such as a finance channel, the system 10 would indicate to the user that a player indicated in their user profile is on a particular channel providing the ability of the user to watch or record the particular programming. This concept can also be applied to actors, movie types, sports, other players, automobile manufactures or otherwise.

In one particular exemplary embodiment, the user system 14 is integrated in hardware and/or software components of a cellular phone. For example, the transmitter/receiver 22 comprises a transmitter/receiver 22 used in cellular phones for cellular communication. The display screen 24 comprises a screen and user interface of the cellular phone. Further, the cellular phone includes a digital recording device comprising a memory module for recording media, generating user interfaces, generating messages, combinations thereof or otherwise.

In one particular mode of operation, referring again to FIGS. 1-5, during viewing of media being disseminated from the media content provider 12, should the viewer find a particular media content of interest, the user records and initiates the user interface 32 to select other users to which to share the media content with. Optionally, the user includes a message with the recorded media, such as "check this out", "did you see that play", "best part of the movie", or otherwise. The recorded media and message is sent to another user system 14, through the media content provider 12 and more specifically receiver 20. Should the recipient be authorized to receive the media and have sufficient memory, the message and media is transferred to the second user system 14.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A media sharing and communication system, consisting of:
    a recording mechanism that records a desired portion of media upon activation by a first individual user who is not a content provider, the portion of media being less than a full media episode;
    a friend request mechanism for sending and receiving friend requests between users to be approved to receive and share media and wherein the friend request mechanism suggests friends who have similar interests of the first individual user;
    a first user transmitter/receiver included in a first user system that transmits the portion of media and a message generated by the first individual user regarding the portion of media to a second individual user who is not a content provider, the first user system including a first user interface having an input device and screen view that is generated by software stored on a memory device of the first user transmitter/receiver, the first user system including a user profile generator interface;

a confirmation mechanism that confirms that the second individual user is authorized to view the portion of media and a notification mechanism that notifies the first individual user if the second individual user is not authorized to receive the portion of media and notifies the second individual user that the portion of media cannot be received due to programming configuration subscribed to by the second individual user; and a second user transmitter/receiver included in a second user system that receives the portion of media upon authorization of the second individual user; the second user system including a second user interface having an input device and screen view that is generated by software stored on a memory device of the second user transmitter/receiver, the second user system including a user profile generator interface.

2. The media sharing and communication system of claim 1, wherein the media is chosen from the group consisting of program information, programming shows, movies, concerts, and sporting events.

3. The media sharing and communication system of claim 1, wherein the second user transmitter/receiver includes a recording mechanism that records a desired portion of media upon activation by the second individual user and can transmit the portion of media to the first individual user.

4. The media sharing and communication system of claim 1, wherein the first user transmitter/receiver includes a wireless communication link.

5. The media sharing and communication system of claim 1, wherein a media content provider disseminates media through a communication link.

6. The media sharing and communication system of claim 1, wherein the first user interface transmits the portion of media to the second user transmitter/receiver based upon a profile established through a user interface of the second user transmitter/receiver.

7. The media sharing and communication system of claim 6, wherein the profile comprises select program or program type disseminated by a media content provider.

8. The media sharing and communication system of claim 6, wherein the profile comprises personal information of the user of the first user transmitter/receiver.

9. The media sharing and communication system of claim 1, wherein the first user transmitter/receiver automatically records media disseminated by the media content provider based upon preferences entered into a user profile of the first user transmitter/receiver.

10. The media sharing and communication system of claim 1, wherein the notification mechanism notifies the first individual user, the second individual user, or both, if the second user transmitter/receiver does not have sufficient memory to receive the portion of media.

11. The media sharing and communication system of claim 1, wherein the first user transmitter/receiver, recording mechanism and first user interface are incorporated in a cellular phone.

* * * * *